Jan. 22, 1963  S. C. ROCKAFELLOW  3,075,094
PULSE GENERATION FROM A THREE-PHASE SOURCE
Filed April 18, 1960  4 Sheets-Sheet 1

INVENTOR.
STUART C. ROCKAFELLOW
BY
Woodhams, Blanchard and Flynn
ATTORNEYS

INVENTOR.
STUART C. ROCKAFELLOW
BY
Woodhams Blanchard and Flynn
ATTORNEYS

United States Patent Office 3,075,094
Patented Jan. 22, 1963

3,075,094
PULSE GENERATION FROM A THREE-PHASE SOURCE
Stuart C. Rockafellow, Plymouth, Mich., assignor to Robotron Corporation, Detroit, Mich., a corporation of Michigan
Filed Apr. 18, 1960, Ser. No. 22,791
6 Claims. (Cl. 307—106)

This invention relates to circuitry for producing sharp and controllably spaced pulses of power from an A.C. source wherein the pulses are of magnitude substantially greater than the magnitude of the applied voltage from the source at the instant the pulse is delivered, and particularly to circuitry for delivering short pulses of power to a load, such as a welding transformer, for effecting a pulse welding operation.

This application discloses and claims a portion of the subject matter of my patent application Serial No. 842,451 filed September 25, 1959, and assigned to the assignee of this application, now abandoned, and the application Serial No. 842,451 was in turn a continuation-in-part of patent application Serial No. 763,725, filed September 26, 1958.

While the circuitry embodying the invention is applicable to a wide variety of specific uses, and for use with both inductive and resistive loads, it has been developed primarily in connection with resistance welding operations and its present commercial use is primarily in the resistance welding field. Therefore, circuitry and nomenclature appropriate to the resistance welding field will be utilized to illustrate the invention but it will be recognized that the choice of such circuitry and nomenclature is for illustrative purposes only and such choice indicates no limitation on the invention.

It has in the past been found useful in a variety of welding operations to pass a plurality of short pulses of power through a welding transformer in order to concentrate the welding heat developed thereby within the junction portion of the welding zone. By using short pulses of power, so that the heat applied to the welding zone is discontinuous, opportunity is afforded for the heat at the welding zone to dissipate into the surrounding metal and thereby avoid damage due to over-heating thereof, yet sufficient heat is obtained at the precise point of welding to effect satisfactory fusion of the metal. This form of welding has been previously used in a variety of circumstances where it was undesirable to generate a great amount of heat in the weld zone, such as in the welding of aluminum, the welding of relatively thin sheets of metal or in the welding of plastic coated metal, such as vinyl coated steel sheets.

Circuitry, whereby these findings and principles have been successfully utilized, is disclosed and described in my above-mentioned patent applications Serial No. 842,451 filed September 25, 1959, and Serial No. 763,725, filed September 26, 1958.

In a continuing effort to improve the circuits and devices characterizing the invention disclosed in said application Serial No. 842,451, it was found that by appropriate changes in the input circuit to the primary of a conventional welding transformer, an ordinary three-phase supply to said input circuit can produce the desired, pulsating output in the secondary of the welding transformer.

By providing the plurality of high magnitude, current waves of extremely short duration during each half cycle of the input voltage, a more intense heat is developed at the point of weld without increasing the $I^2R$ losses between the source of electrical potential and the contact points of the welding electrodes. However, it is necessary to the most efficient operation that the plurality of pulses appearing in the secondary of the welding transformer be of alternating polarity in order to prevent saturation of the welding transformer. As disclosed in Serial No. 842,451, a high pulse repetition rate can be produced from a three-phase source if a plurality of pulses are developed during each half cycle of the voltage output from each phase of the source. However, in order to avoid the saturation of the transformer, the pulses which are developed in a particular half cycle are preferably alternating in polarity.

This has been accomplished, as disclosed in Serial No. 842,451, by providing a relatively expensive power input which, under some circumstances, might offset the advantages resulting from an increase in the output pulses. In this instance, and for example, the power source disclosed substantially for this purpose in said Serial No. 842,451, is a four wire, Y connected A.C. source.

The desirability of a low-cost circuit operable with a standard three-phase power source has been clearly recognized but was previously not achieved. As a result of such a circuit, the use of pulse welding procedures in low-quantity production work, in piece work and even in relatively small shops becomes economically feasible. Moreover, such equipment becomes economically available where high-quality and low-quantity welds are desirable both from the standpoint of appearance and strength. Since very little forging pressure is required in this type of welding, it can be advantageously used on relatively thin and/or soft materials, or on materials comprising plural components which may have widely dissimilar melting points such as vinyl clad steel, aluminum-coated steel or galvanized steel.

Accordingly, a primary object of this invention has been the provision of an improved pulse generating circuit of greater simplicity and of reduced initial cost, which is capable of developing a high-pulse repetition rate.

A further object of this invention has been the provision of a pulse generating circuit, as aforesaid, wherein the magnitude of the voltage pulses developed in the load is substantially in excess of the magnitude of the input voltage at the time of such pulses, wherein a plurality of pulses can be generated in each phase of a three-phase input during each half cycle of each phase, wherein the position of the pulses in each half cycle of the input can be accurately located and adjusted along the input wave form, and both the magnitude and duration of the pulses can be adjusted independently of each other.

A further object of this invention has been the provision of a pulse generating circuit, as aforesaid, wherein the input power can be provided by a standard three-phase source, wherein the output generated by each phase appears in the secondary of the load transformer as a plurality of pulses of alternating polarity, wherein a minimum of maintenance will be required to permit continuous trouble-free operation of the system, such as both resistive and inductive loads with which the pulse generating circuit is used.

Other objects and purposes of this invention will be apparent to persons acquainted with circuits and devices of this general type upon reading the following descriptive material and inspecting the accompanying drawings, in which.

GENERAL DESCRIPTION

The objects and purposes of the invention, including those set forth above, have been met by providing a circuit connectible between a standard, three-phase alternating source and a welding transformer having three similar and center-tapped primary windings. Each center tap is connected to a different one of the three output lines of the three-phase source, which may be a delta-wound generator. In the particular embodiment of the invention disclosed herein one end terminal of each primary winding is connected in series through a capacitance and a valve circuit or contactor to an output line of said three-phase source, other than the line connected to its center tap, all three of said end taps or terminals being connected to different lines from said source. The other end terminal of each primary winding is connected through a pair of parallel contactor-capacitor circuits to the same output line of said source as its corresponding first-mentioned end terminal. Accordingly, there are three paths of current flow from each phase of the output source to one of the primary windings, and all of said current paths include a contactor in series with a capacitor. Moreover, one of said current flow paths from each phase will induce into the secondary winding of the transformer a current flow having a polarity which is of opposite polarity to the induced current flow in the secondary winding produced by a current flow through the other two paths to the same primary winding.

In a more basic form of circuit, which underlies this invention, there is only one contactor-capacitor circuit, hence only one path of current flow, between each phase of the three-phase source and each corresponding primary winding. In such case, the primary windings have no center tap and they are connected across their respective phases in series with their respective contactor-capacitor circuits.

DETAILED CONSTRUCTION

Figure 1:
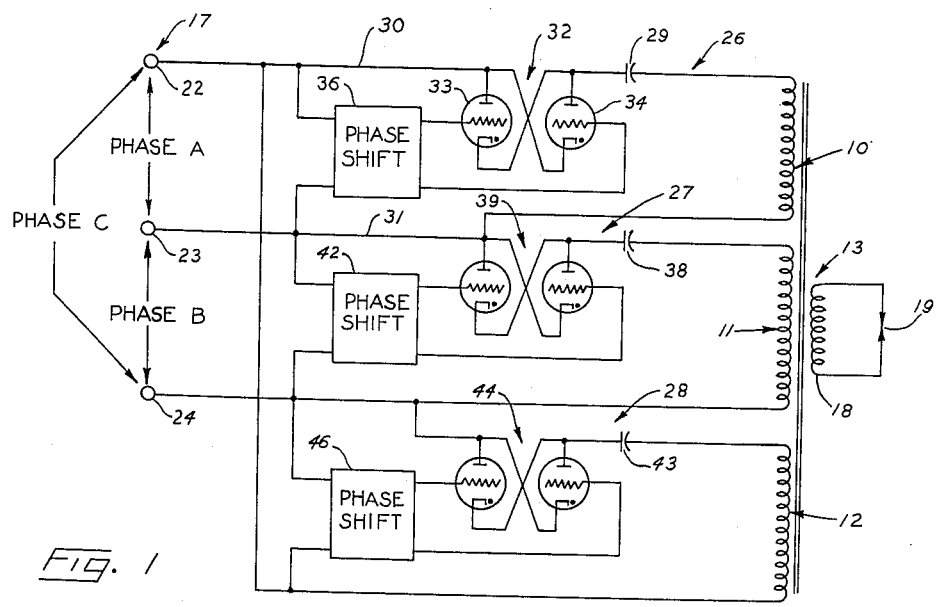
FIGURE 1 is a diagram of a circuit embodying the principles underlying the invention.
Figure 2:
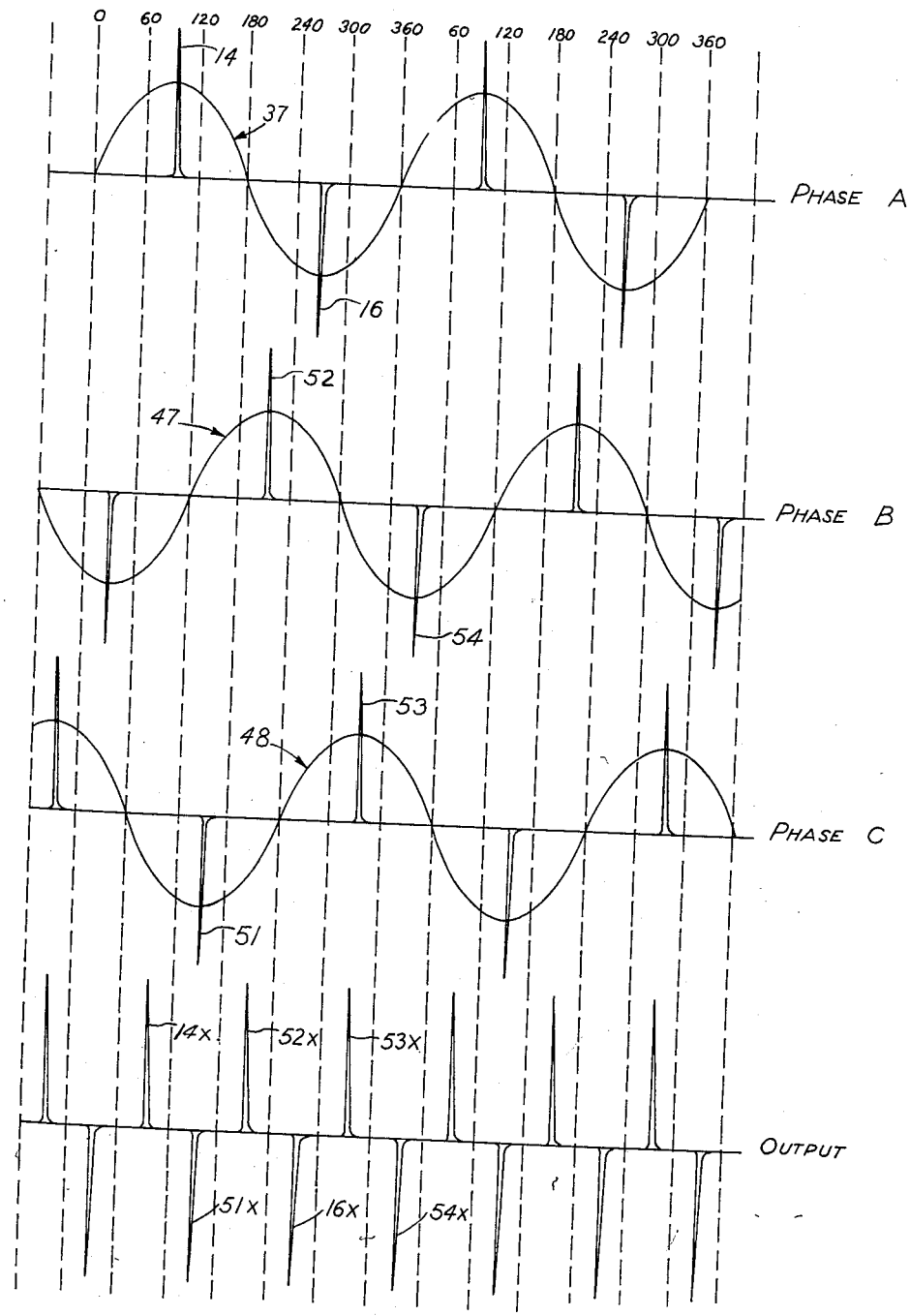
FIGURE 2 is a chart illustrating the relationship between the pulses and phases in the output from the circuit of FIGURE 1.

FIGURE 1 discloses a circuit whereby the primary windings 10, 11 and 12 of the transformer 13 receive pulses, such as those shown at 14 and 16 in FIGURE 2 from the three-phase, alternating source 17, which may be a standard, delta-wound three-phase generator. The transformer 13 has a secondary winding 18 which is connectible to energy-utilizing means, such as the electrodes of a welding head 19. The power source 17 has terminals 22, 23 and 24, the "A" phase being between terminals 22 and 23, the "B" phase between terminals 23 and 24 and the "C" phase between terminals 22 and 24, in this particular embodiment. This circuit and its operation have been described in detail in patent application Serial No. 842,451 and reference is made to such application. However, for convenience, a brief description of the circuit in FIGURE 1 follows herein.

The primaries 10, 11 and 12 (FIGURE 1) are connected respectively to the A phase, B phase and C phase of the three-phase power source 17 by the input circuits 26, 27 and 28. The primary winding 10 is connected in series with a capacitor 29 and contactor or valve circuit 32 by the conductors 30 and 31 across the terminals 22 and 23 of the power source 17. The valve circuit 32 may be comprised of a pair of electrical valves, such as the thyratrons 33 and 34, which are connected in the well-known, back-to-back or inverse relation so as to provide for conducting current from the power source 17 to the primary winding 10 alternatingly in both directions. The control grids of the thyratrons 33 and 34 are connected through a phase shift circuit 36, which may be of a conventional type and which is connected across the line conductors 30 and 31 of the input circuit 26. Accordingly, by appropriate adjustment of the phase shift circuit 36, the firing of the thyratrons 33 and 34 can be accurately located and adjusted with respect to the corresponding half cycle of the voltage wave 37 (FIGURE 2) produced by the A phase of the power source 17. For maximum heat requirements, the current pulses 14 and 16 will be located at or near the maximum amplitude of the voltage input wave and for lesser heat requirements said pulses will be phase shifted in a known manner in one direction or the other from said maximum.

The current pulse 14 is produced, by way of example, when the current flow through the input circuit 26 is such that the thyratron 34 is rendered conductive, and the current pulse 16 therefore is produced by rendering the thyratron 33 conductive. The current pulses 14 and 16 are of extremely short duration because of the self-extinguishing action effected by the operation of the circuit 26. That is, when the thyratron 34, for example, is energized by its grid, at a moment selected by the phase shift circuit 36, the capacitor 29 is immediately charged at a rate characterized by the steep rise in the pulse wave 14. However, in thus charging the capacitor 29, an opposing potential is developed on the capacitor which when the capacitor 29 is substantially full charged, blocks the anode potential and the current flow through the thyratron 34 is terminated abruptly, the values of the capacitance, inductance and resistance of the circuit all being chosen in view of the source characteristic, to cause the capacitor to become fully charged within a very short period, as a few milliseconds at the most. Thus, the fall in the pulse 14 is nearly as abrupt as was its rise and the duration of such pulse is extremely short, such as a few milliseconds at most and usually less than one millisecond.

It will be recognized as the description progresses that, although thyratrons 33 and 34 are specifically described as the valves used in the valve or discharge circuit 32, both arc-discharge devices and gaseous discharge devices may be used interchangeably, depending upon the needs of the particular use.

The input circuit 27 (FIGURE 1), which includes a capacitor 38, a discharge circuit 39 and the phase shift circuit 42, connects the primary winding 11 to the output terminals 23 and 24 of phase B in the power source 17. The input circuit 28, which includes the capacitor 43, a discharge circuit 44 and the phase shift circuit 46, connects the primary winding 12 across the terminals 22 and 24 of phase C in the power source 17. The input circuits 27 and 28 are preferably, but not necessarily, substantially identical with the input circuit 26, described above.

As shown in FIGURE 2, the voltage waves 37, 47 and 48, of phases A, B and C, respectively, are out of phase with respect to each other by 120 degrees, in a substantially conventional manner. Accordingly, a positive current pulse 14, produced by the input circuit 26 in this particular embodiment, is followed by a negative current pulse 51 produced by the input circuit 27 and appearing in the primary winding 12. The pulse 51 is followed by a positive current pulse 52 produced by the input circuit 28 and applied to primary winding 11. Thereafter, and in order, the input circuits 26, 28 and 27 produce current pulses 16, 53 and 54, respectively, which appear in the windings 10, 12 and 11, respectively. By projecting the pulses produced by the input circuit 26, 27 and 28 upon a common axis (shown in lower part of FIGURE 2) representing the current output of the secondary winding 18, there is produced a series of uniformly spaced current pulses of substantially uniform intensity and alternating polarity identified as 14x, 51x, 52x, 16x, 53x and 54x, in that order.

Accordingly, the circuit shown in FIGURE 1 is capable of producing a series of alternating current pulses of extremely short duration and of high intensity. However, in this embodiment only one pulse is produced during each half cycle of the voltage wave from each phase.

Accordingly, the total pulse output from the secondary winding 18 is limited to 360 pulses per second from a standard 60 cycle, three-phase output.

Figure 3:
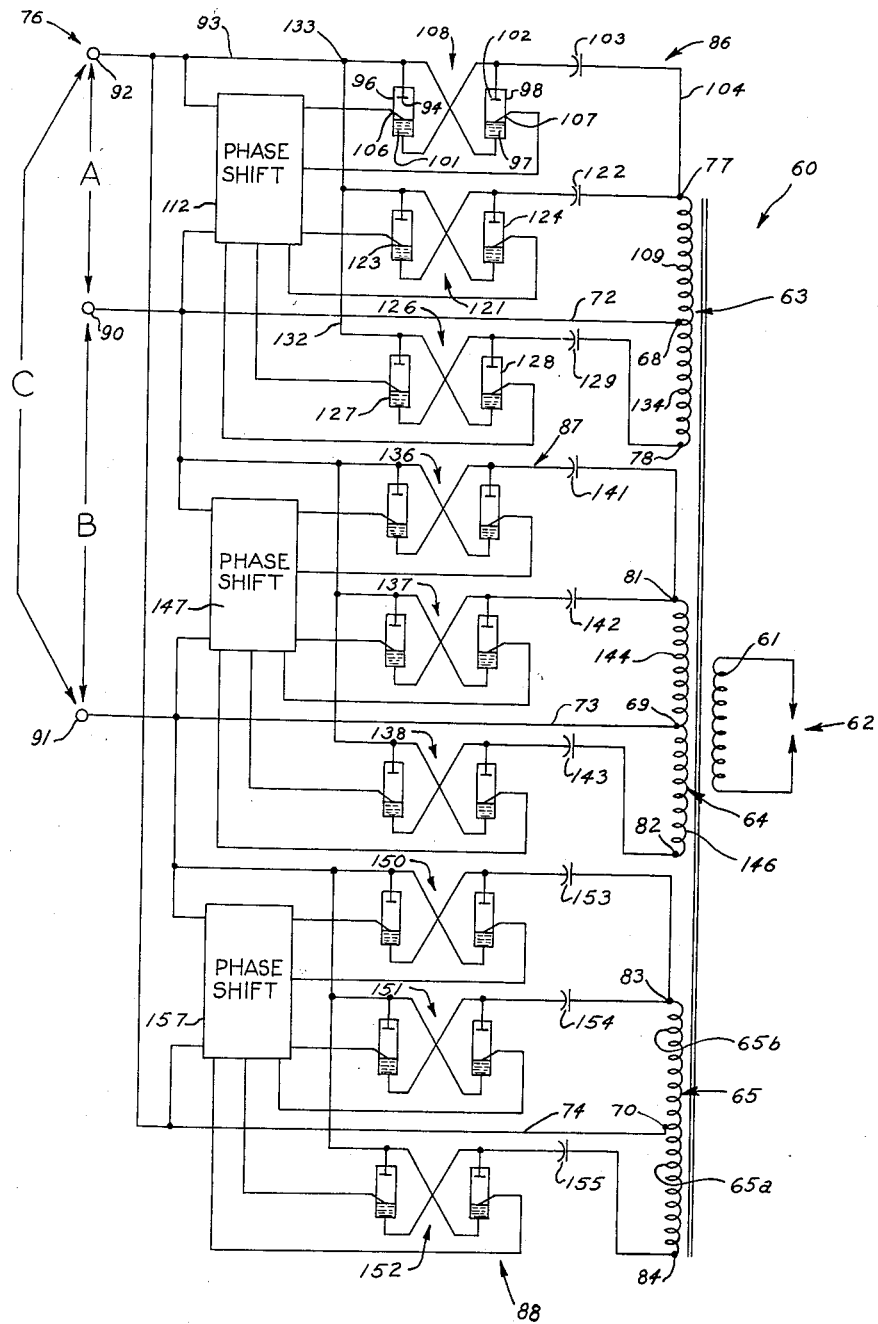
FIGURE 3 is a diagram of another circuit embodying the invention.

As disclosed in Serial No. 842,451, a plurality of pulses may be produced during each half cycle of the output wave from each phase of the three-phase source, if the three-phase source is specially constructed and the circuit connecting the source to the load transformer is specially arranged. FIGURE 3 of this application illustrates a circuit capable of tripling the number of current pulses appearing in the transformer secondary 18 of FIGURE 1 while still maintaining the alternating characteristics of such pulses in order to avoid transformer saturation.

The circuit shown in FIGURE 3, which has been selected to illustrate a preferred embodiment of the invention, is particularly applicable to resistance welding. However, it will be quickly recognized and understood that the same or a similar circuit containing only minor modifications in the load, and/or the number of duplicated components of the circuit, may be applied to a variety of different uses.

The welding circuit of FIGURE 3 is comprised of a welding transformer 60 having a secondary winding 61 connected between the electrodes of the resistance welding head 62 of any convenient, conventional type. The transformer 60 has three primary windings 63, 64 and 65 which are preferably, but not necessarily, substantially identical in their electrical characteristics. The primary windings 63, 64 and 65 have the center taps 68, 69 and 70, respectively, which are connected by the conductors 72, 73 and 74 to the terminals 90, 91 and 92, respectively, of the source 76 of three-phase alternating potential. The primary windings 63, 64 and 65 also have end terminals at the opposite ends of each which are identified by the numerals 77 and 78, 81 and 82 and 83 and 84, respectively.

The input circuit 86 to the primary winding 63 from the three-phase source 76 is preferably substantially identical to the input circuits 87 and 88 connecting the power source 76 to the primary windings 64 and 65. Accordingly, the input circuit 86 will be described in detail and such description will be understood to apply in substance to the input circuits 87 and 88.

The input circuit 86 includes the conductor 72 which is connected between the center tap 68 on the primary winding 63 and terminal 90 of the A phase. The other terminal 92 of said A phase is connected by a conductor 93 to both the anode 94 of one electrical valve 96 and to the cathode 97 of another valve 98. The cathode 101 of the valve 96 and the anode 102 of the valve 98 are connected in series with a capacitor 103 and to the end tap 77 on the primary winding 63 by the conductor 104.

In this particular embodiment, the valves 96 and 98 are of the arc-discharge type, such as an ignitron, which have ignitors 106 and 107, respectively. The ignitrons are particularly well suited to the particular application involved because of their ability, when energized, to pass large currents between their principal electrodes. However, it will be recognized that other types of valves, such as thyratrons, may be utilized to accomplish substantially the same or similar purposes. The ignitrons 96 and 98 are connected in anti-parallel, back-to-back or inverse relation so that current is conducted in both directions between the power source 76 and the primary winding 63.

For convenience of description, the combined back-to-back ignitrons 96 and 98, as connected herein, may be hereinafter referred to as a contactor or valve circuit 108. Accordingly, the valve circuit 108, the capacitor 103 and the portion 109 of the primary winding 63 are connected in series between the terminals 90 and 92 of the power source 76.

The ignitors 106 and 107 (FIGURE 3) are connected to a phase shift circuit 112, which is able, in a well-known manner, to energize the ignitors at a selected instant and thereby render their respective ignitrons 96 and 98 conductive at any selected point in a desired half cycle of the output voltage from phase A of source 76. The phase shift circuit 112 is connected across the output lines 72 and 93 from phase A of the power source. When said ignitrons conduct, the current pulses 113 and 114 (FIGURE 4) are created thereby at selected points during the respective positive and negative half cycles 116 and 117 of the voltage curve 118.

The capacitor 103 is selected to produce pulses 113 or 114 which appear in the primary winding 63 for a relatively short period of time. As described above with respect to the pulses appearing in FIGURE 2, the shape of the pulses 113 and 114 represents the rate at which the capacitor 103 becomes substantially charged, and is controlled by proper selection in a known manner of the capacitance, inductance and resistance of the entire circuit, in view of the magnitude of the source voltage. The charging of the capacitor 103 can occur only while the valve circuit 108 is conductive. Thus, the duration of the pulses 113 and 114 is identical with the duration of such conduction and is dependent upon the time required for said capacitor 103 to become substantially fully charged.

The input circuit 86 (FIGURE 3) also includes a valve circuit 121 in series with a capacitor 122, both being connected in parallel with the valve circuit 108 and capacitor 103. The valve circuit 121, which may be substantially identical with the valve circuit discussed above, is comprised of ignitrons 123 and 124 having ignitors which are energized by the phase shift circuit 112 in preselected and timed relationship with the energization of the valve circuit 108.

Figure 4:
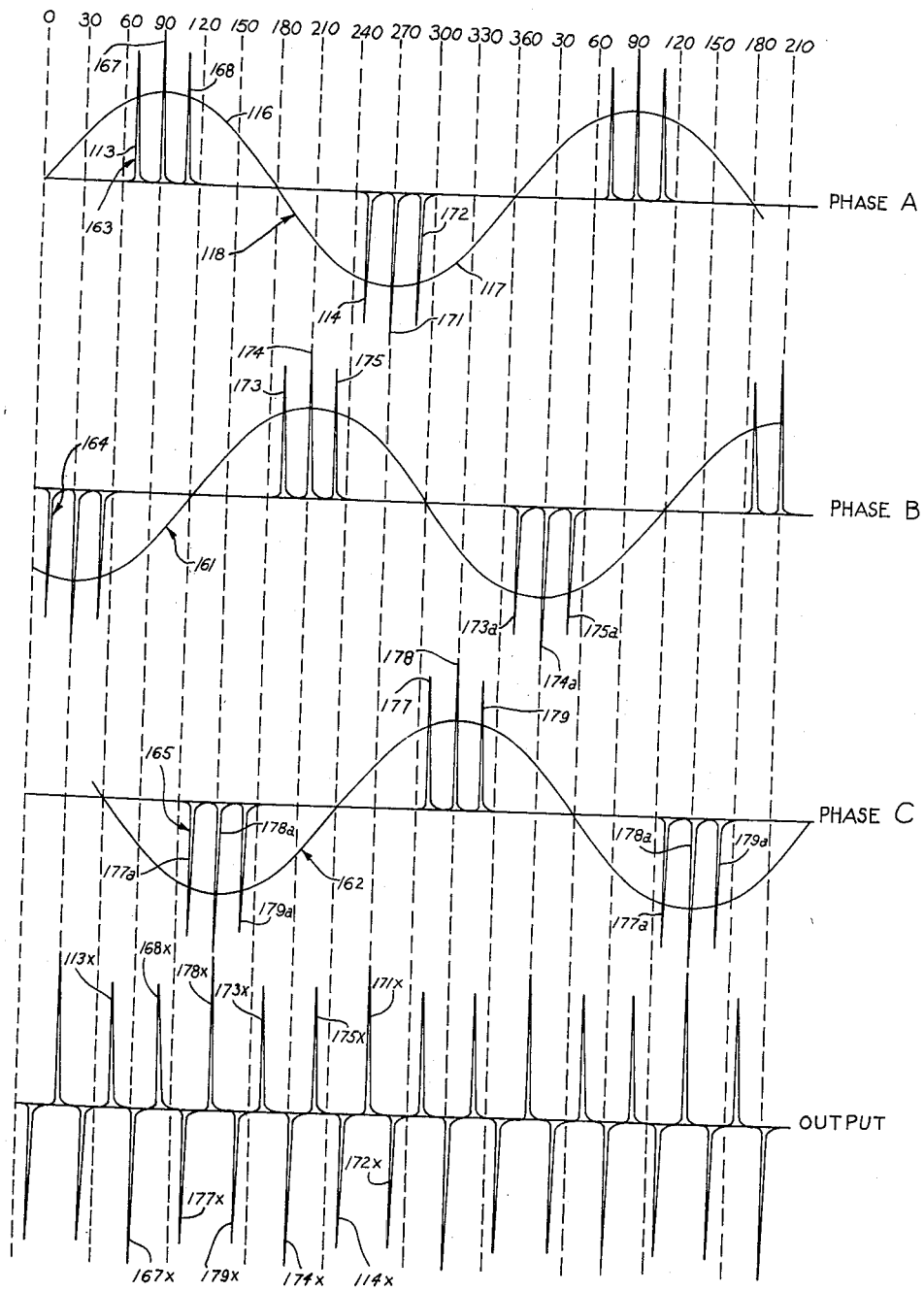
FIGURE 4 is a chart illustrating the relationship between the phases and pulses in the output from the circuit of FIGURE 3.

The capacitor 122 (FIGURE 3) may be similar in characteristics to the capacitor 103. Accordingly, the valve circuit 121, capacitor 122 and the portion 109 of the primary winding 63 are connected in series across the terminals 90 and 92 of phase A of the source 76. Charging of the capacitor 122 in response to conduction by valve circuit 121 produces current pulses 168 and 172 (FIGURE 4).

The valve circuit 126 (FIGURE 3), which is comprised of ignitrons 127 and 128, is connected in series with a capacitor 129 by means of a conductor 132 between the end tap 78 on the primary winding 63 and a junction point 133 in the conductor 93. The valve circuit 126 and capacitor 129 may be substantially the same as the valve circuit 121 and capacitor 122. Accordingly, the valve circuit 126, the capacitor 129 and the portion 134 of the primary winding 63 are connected in series between terminals 90 and 92 of phase A of power source 76. However, a current flow from a given source wave through the portion 134 of the primary winding 63 will induce a current flow in the secondary 61 which is of opposite polarity to the current flow induced in said secondary by a current flow from the same source wave through the portion 109 of said primary winding. The conduction of the ignitrons 127 and 128 is controlled by the phase shift circuit 112.

The input circuit 87 (FIGURE 3), which energizes the second primary winding 64, is connected across the terminals 90 and 91 of the power source 76, which comprises phase B thereof. The input circuit 87, which may be substantially identical to the input circuit 86, includes three valve circuits 136, 137 and 138 which are connected in series respectively with the capacitors 141, 142 and 143. The valve circuits 136 and 137 and the capacitors 141 and 142 are connected in parallel circuits which are in turn connected in series with one portion 144 of the primary winding 64.

The other portion 146 of the primary winding 64 is connected in series with the valve circuit 138 and the capacitor 143. Operation of the valve circuits 136, 137 and 138 is controlled by the phase shift circuit 147.

The input circuit 88 (FIGURE 3), which connects the C phase of the power source 76 to the primary winding 65, may be substantially identical to either one of the input circuits 86 and 87. Specifically, said input circuit 88 includes the valve circuits 150, 151 and 152, the capacitors 153, 154 and 155, and the phase shift circuit 157 which controls the operation of the valve circuits 150, 151 and 152.

FIGURE 4 illustrates the source voltage curves 118, 161 and 162 which enter the input circuits 86, 87 and 88, respectively, from the phases A, B and C, respectively, of the three-phase source 76. Superimposed upon the voltage curves 118, 161, and 162 are the current pulses 163, 164 and 165 supplied to the primary windings 63, 64 and 65, respectively, from the circuits 86, 87 and 88, respectively. For example, the current flow to the winding 63 is indicated by pulses in the current curve 163 responsive to the charging of the capacitors 103, 122 and 129.

The charging of the capacitors 103, 129 and 122, in that order, during the first (or positive) half cycle 116 (FIGURE 4) of the input voltage 118 produces the current pulses 113, 167 and 168, respectively, in the primary winding 64. During the second (or negative) half cycle 117, the pulses 114, 171 and 172 are produced in said primary winding 64, the current pulses 114, 171 and 172 being associated with the negative half cycle for illustrative purposes only. In a similar manner, charging of the capacitors 141, 143 and 142 produces pulses 173, 174 and 175 in the current wave 164 during the positive half cycle of input voltage 161 to the input circuit 87. During the negative half cycle of curve 161, the current pulses 173a, 174a and 175a are produced.

The capacitors 153, 155 and 154 when charged during the first (positive) half cycle of the input voltage from phase C produce current pulses 177, 178 and 179, and, when charged during the negative half cycle produce current pulses 177a, 178a and 179a in the primary winding 65.

The individual pulses developed in said primary windings from phases A, B and C of the three-phase potential 76 produce corresponding pulses in the secondary winding of said transformer and the pulses in the secondary winding corresponding to the portions 134, 146 and 65a of the primary windings are of opposite sense to the pulses in the secondary corresponding to portions 109, 144 and 65 of the primary windings. Hence, the output pulses from said secondary winding, when projected upon a single axis appear as shown at the bottom of FIGURE 4.

OPERATION

As shown in FIGURE 4, the source phases A, B and C are out of phase with each other by 120 degrees. Thus, by proper adjustment of the phase shift circuit 112, the ignitrons in the discharge circuits 108, 121 and 126 are caused to conduct in a preselected sequence. In this embodiment, conduction occurs through the valve circuits 108, 126 and 121, in that order, first in the positive half cycle to produce the pulses 113, 167 and 168, respectively. This is followed by a corresponding sequential operation of the discharge devices in the input circuits 87 and 88 during the positive half cycles of the input voltages 161 and 162, respectively. The sequence of operations is then repeated by input circuits 86, 87 and 88 during the negative half cycles of the voltage inputs 118, 161 and 162. However, because of the overlap in the positive and negative half cycles of the three phases, the phase shift circuits 112, 147 and 157 are set so that three pulses are developed from each of the phases, starting with phase A (FIGURE 4) in the following sequence: phase A, positive half cycle; phase C negative half cycle; phase B, positive half cycle; phase A negative half cycle; phase C positive half cycle; phase B negative half cycle and back again to phase A positive half cycle.

The operation of a single ignitron, such as the ignitron 98 in the circuit 86, whereby the capacitor 103 is charged to create a pulse 113, is substantially the same as set forth above with respect to the operation of the thyratrons in the circuit of FIGURE 1. That is, when the ignitron 98 conducts, the potential across phase A of the power source 76 is impressed upon the capacitor 103 until said capacitor 103 is substantially fully charged. The characteristics of the capacitor 103 are such that its rate of charging, hence the current flow in the input circuit resulting therefrom, decreases substantially as abruptly as it increases. The potential thus impressed upon the capacitor 103 blocks the anode potential of ignitron 98 and same is extinguished until after the capacitor 103 has been discharged in the next (negative) half cycle phase A and until the ignitron 98 is again energized during the next positive half cycle of phase A.

The pulse 113 produces a current flow through the portion 109 of the primary winding 63 which builds up and then collapses the field around said winding 63 to induce into the secondary winding 61 a pulse 113x (FIGURE 4).

By appropriate timing of the phase shift circuits 112, 147 and 157, the other ignitrons in the input circuits 86, 87 and 88 are caused to charge their associated capacitors to produce the pulses as shown in FIGURE 4. The pulse 167 is a positive pulse as it appears in the primary winding 63. However, it is shown in the negative direction along the output axis at 167x, because it induces a current flow into the secondary 61 having the opposite direction of flow from the current induced by the charging of the capacitor 103. This obviously results from the fact that current flow, resulting from the sequential charging of the capacitors 103 and 129, through the portions 109 and 134 of the primary winding 63 are in opposite axial directions. In a similar manner, projection of the pulse 168 onto the output axis in FIGURE 4 becomes pulse 168x in the secondary 61.

Accordingly, although the current pulses 113, 167 and 168 through the three parallel circuits including the capacitors 103 and 122 and 129 of the input circuit 86 have occurred during the same half cycle and, therefore, are of the same initial polarity, the resultant current pulses in the secondary winding are alternating current pulses 113x, 167x and 168x, respectively.

While FIGURE 4 shows said pulses clustered around the high point of each source wave, and such is proper for maximum output from the secondary winding, said output may be adjusted as desired in a known manner by phase shifting the point of conductivity of said contactor circuits in one direction or the other to cause the pulses appearing in the primary windings to originate at points in the source wave.

The operation of the input circuit 87 connected to the B phase of the power source 76 as well as the operation of input circuit 88 connected to the C phase of the output source 76 may be substantially identical to the above-described operation of the circuit 86. The above description of the operation of the A phase circuit 86 was specifically concerned with the positive, first-half cycle of the output voltage. However, in the second-half cycle, the negative pulses will be spaced from each other and from the positive pulses produced by the B and C phase circuits 87 and 88 in substantially the same manner as discussed above. Accordingly, and as a result of the circuitry shown in FIGURE 3, nine alternating pulses of output current in the secondary winding 61 can be produced during each half cycle of the three phase output voltage from source 6 which produces one thousand and eighty alternating pulses per second.

Figure 5:
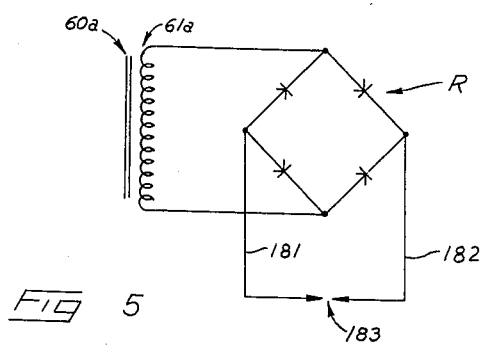
FIGURE 5 is a modified fragment of the circuit shown in FIGURE 3.

Under some circumstances, it may be desirable to use the circuit of FIGURE 3 for plating, arc welding or induction heating operations. In such case, the output of the circuit should be unidirectional. However, this would produce undesirable saturation of the transformer. Accordingly, and as shown in FIGURE 5, the secondary winding 61a of the transformer 60a is connected to the input terminals of a suitable rectifying system, such as the bridge rectifier R, the output conductors 181 and 182 of which may be connected to an arc-welding head 183, for example. In this way, the alternating pulses appearing in the primary 61a, will be converted by the bridge rectifier R into unidirectional pulses between the electrodes of the welding head 183 without disturbing the unsaturated condition of the transformer 60a.

Although particular preferred embodiments of the invention have been disclosed above for illustrative purposes, it will be understood that variations or modifications of such disclosure, which lie within the scope of the appended claims, are fully contemplated.

What is claimed is:

1. A circuit for producing a plurality of short, electrical pulses of alternating polarity from the output of one phase of a multi-phase, commercial alternating source during each half cycle thereof, said one phase having a pair of terminals, comprising: a transformer having a primary winding with a center tap connected to one terminal of said one phase, first, second and third electrical valve circuits, said first and second circuits being connected in parallel with each other between the other terminal of said one phase and one end of said primary winding and said third circuit being connected between the other terminal of said one phase and the other end of said primary winding, each of said valve circuits including a pair of electrical discharge valves connected in reverse polarity with respect to each other and a capacitor connected in series between said valves and said primary winding; and timing means for controlling the conductivity of said valves in timed relationship with the alternations of said one phase.

2. The circuit of claim 1 wherein said electrical discharge valves are thyratrons and said timing means is a phase shift circuit connected to the control grids of said thyratrons.

3. The circuit of claim 1 wherein said electrical discharge valves are ignitrons and said timing means is a phase shift circuit connected to the ignitors of said ignitrons.

4. The circuit of claim 1 wherein said capacitors have substantially identical characteristics including a rapid rate of charging when said electrical valves with which they are associated are conductive.

5. In a circuit for producing from a three-phase commercial alternating source a plurality of intense discontinuous electrical pulses of extremely short duration in the secondary winding of a transformer, said pulses occurring in alternating polarity, the combination comprising: three identical primary windings on the transformer, each primary winding having a center tap respectively connectible to the output terminals of said three-phase source; three input circuits for respectively connecting each of said phases with one of said primary windings, each of said input circuits including first, second and third electrical valve circuits, each valve circuit having a pair of electrical discharge valves connected in reverse polarity with respect to each other, two of said valve circuits being connected in parallel between one terminal on said three-phase source and one end of one primary winding and the other valve circuit being connected between said one terminal of said source and the other end of said one primary winding, three capacitors connected respectively in series with said valve circuits and timing means for controlling the conductivity of said electrical discharge valves in timed relationship with the alternations of the output from the source.

6. The circuit of claim 5 wherein said electrical discharge valves are ignitrons and the timing means is a phase shift circuit connected to the ignitors of said ignitrons.

References Cited in the file of this patent
UNITED STATES PATENTS
2,306,230   Somerville _____ Dec. 22, 1942